May 28, 1963
U. M. LAURENZI
3,091,066
LUMBER WRAPPING APPARATUS WITH GLUE APPLYING
MECHANISM ASSOCIATED THEREWITH
Filed Jan. 17, 1961
7 Sheets-Sheet 1
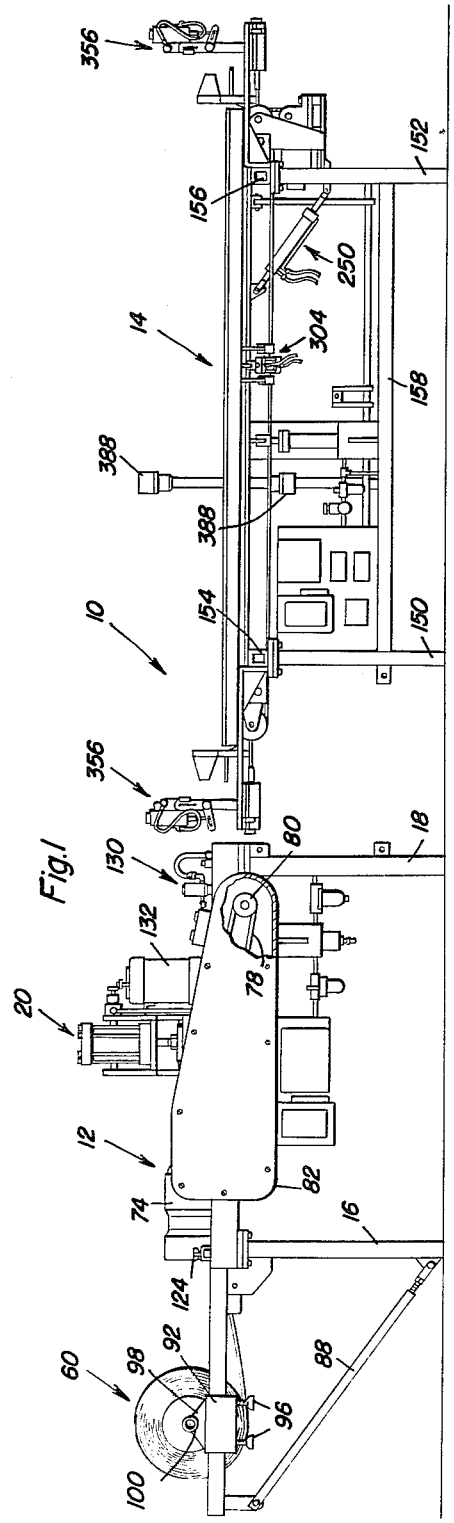
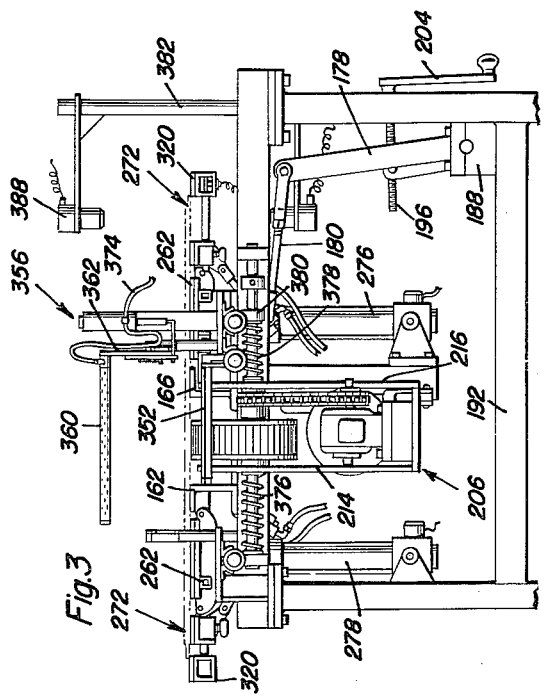
Ugo M. Laurenzi
INVENTOR.
BY Clarence A. O'Brien
and Harvey B. Jacobson
Attorneys May 28, 1963
U. M. LAURENZI
3,091,066
LUMBER WRAPPING APPARATUS WITH GLUE APPLYING
MECHANISM ASSOCIATED THEREWITH
Filed Jan. 17, 1961
7 Sheets-Sheet 2
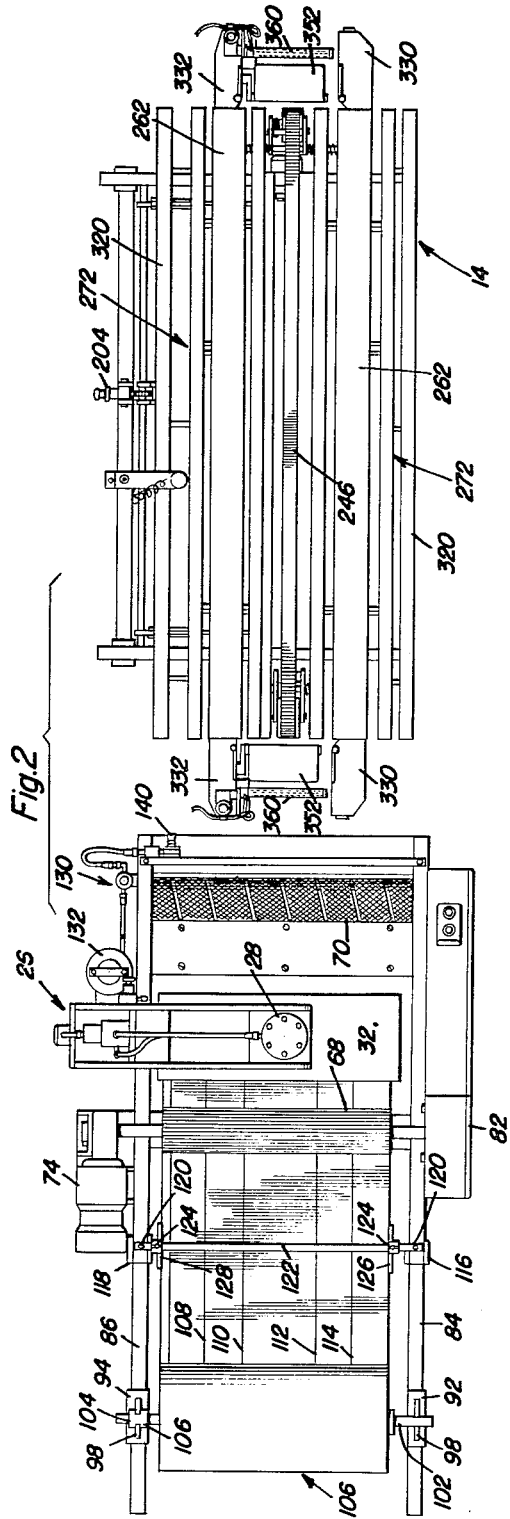
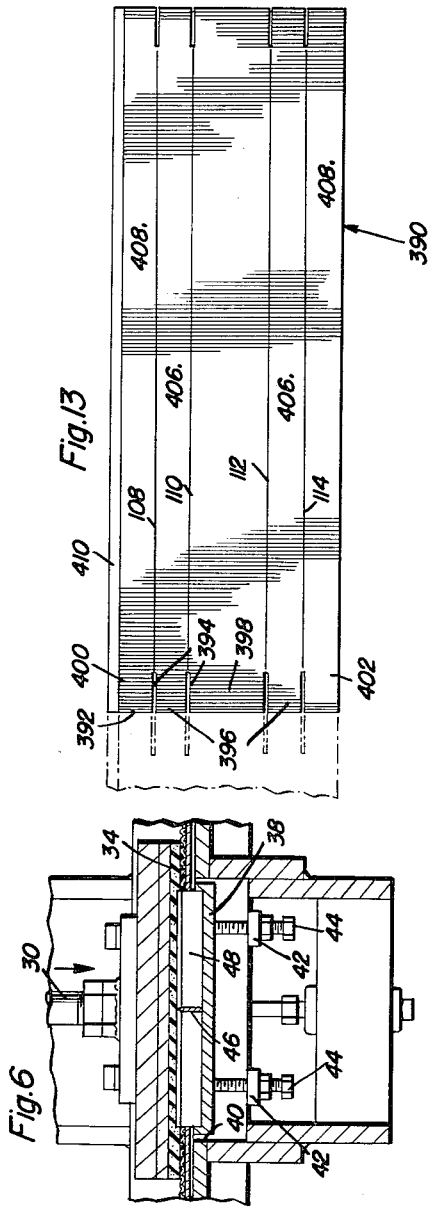
Ugo M. Laurenzi
INVENTOR.
BY *Clarence A. O'Brien*
*and Harvey B. Jacobson*
Attorneys

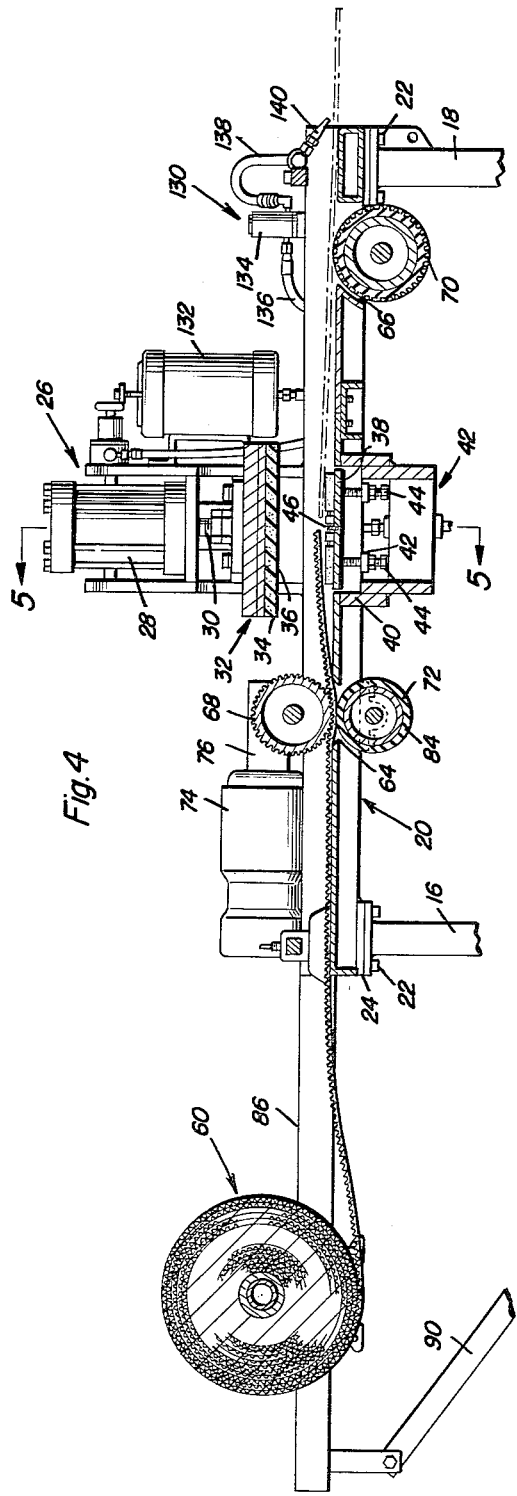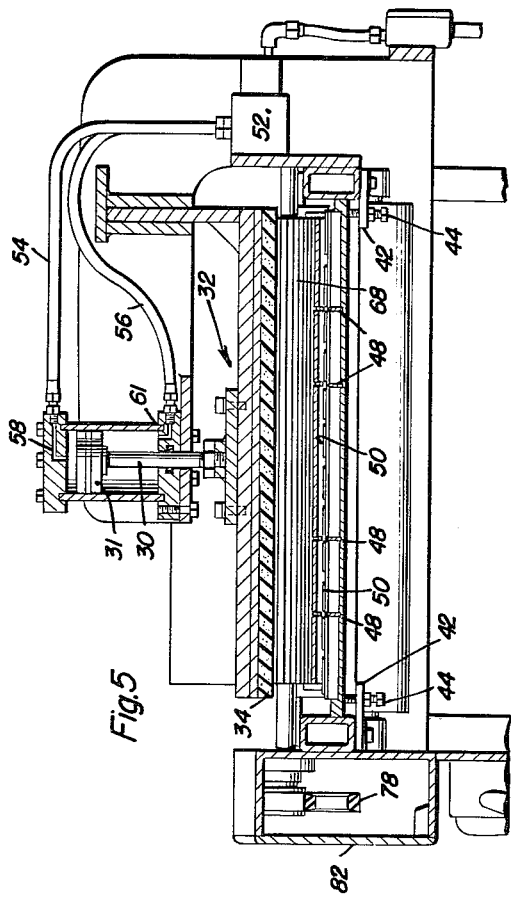
Ugo M. Laurenzi
INVENTOR.

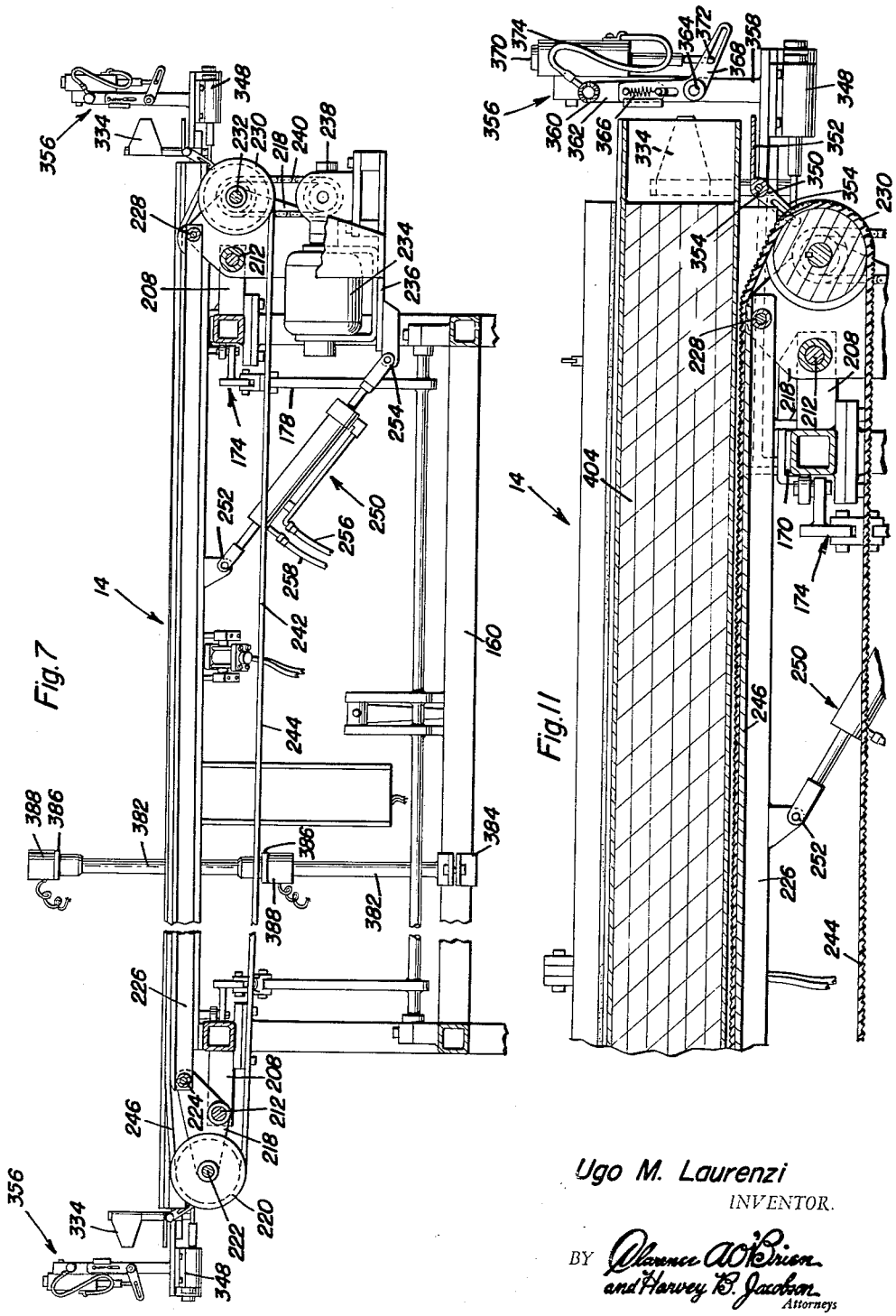

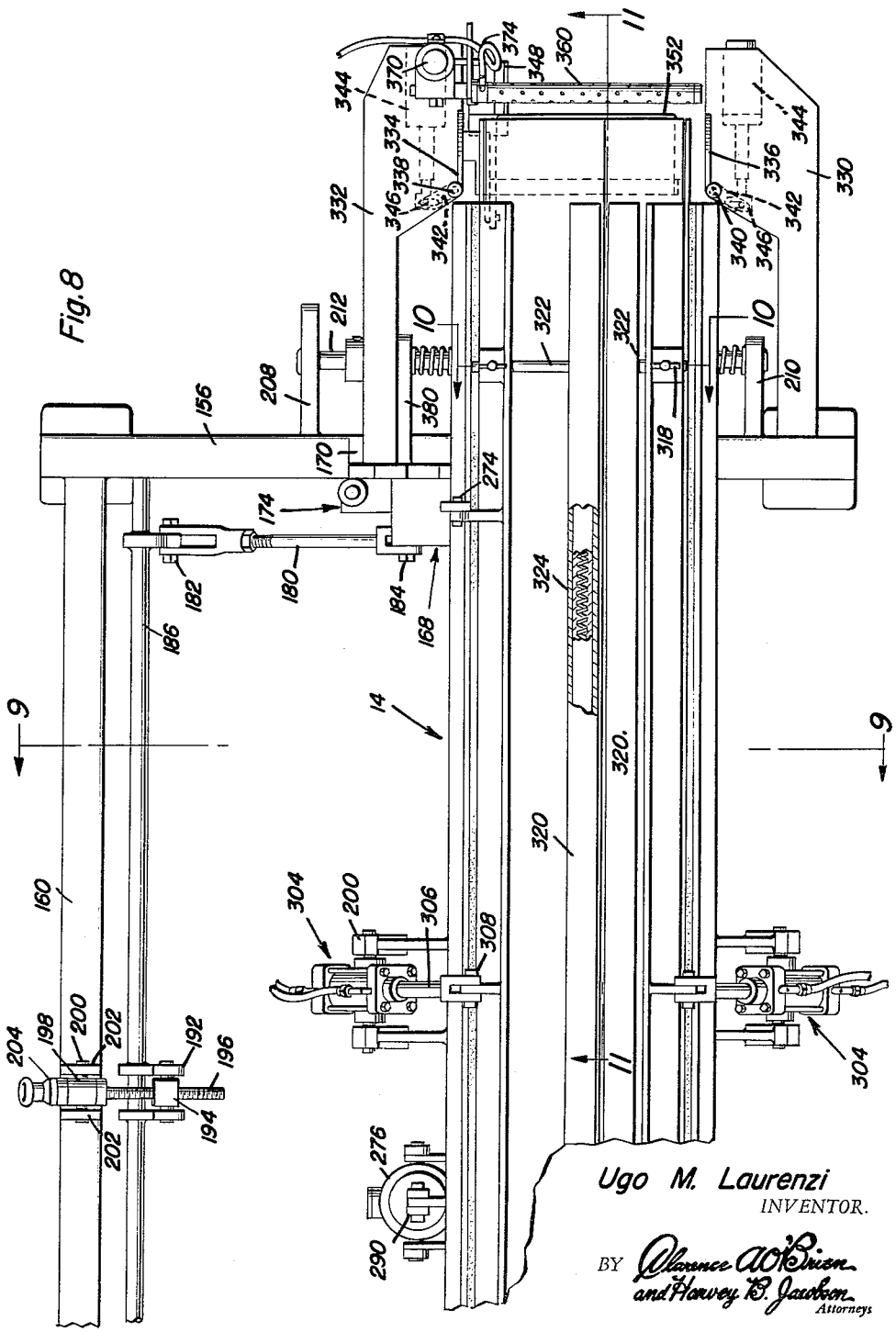

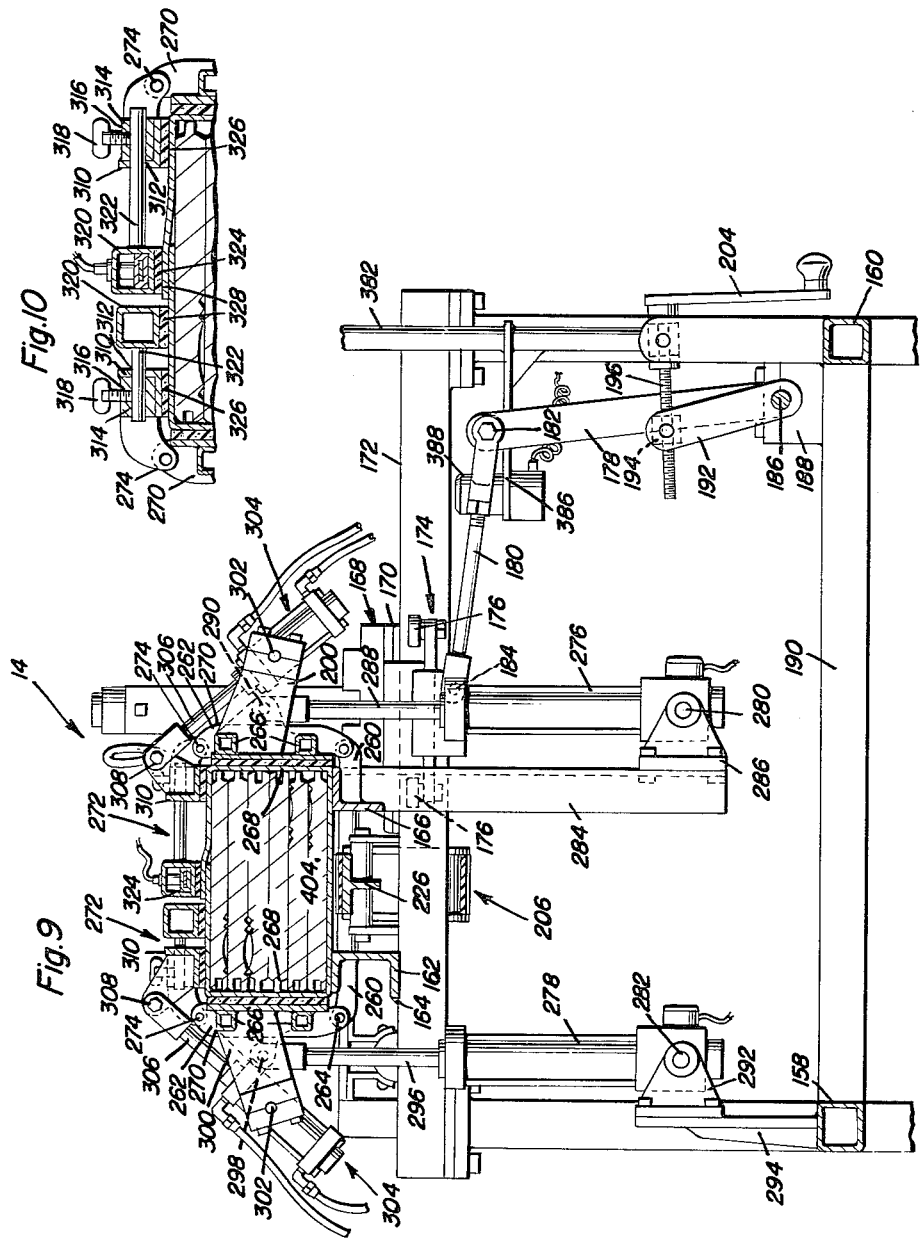

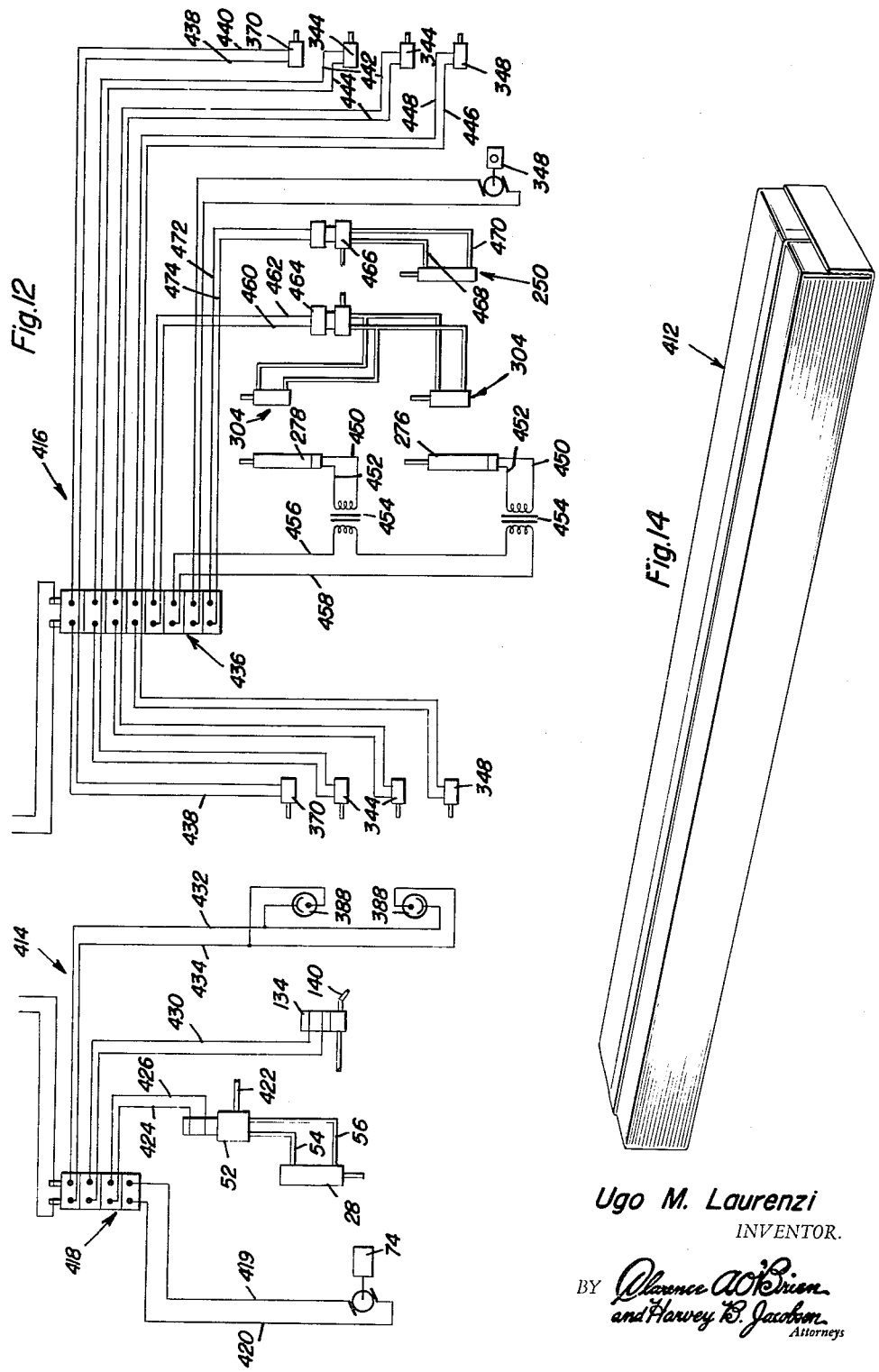

United States Patent Office 3,091,066
Patented May 28, 1963

3,091,066
LUMBER WRAPPING APPARATUS WITH GLUE APPLYING MECHANISM ASSOCIATED THEREWITH
Ugo M. Laurenzi, 3304 Ramona Ave., Sacramento, Calif.
Filed Jan. 17, 1961, Ser. No. 83,204
27 Claims. (Cl. 53—191)

This invention relates to a novel and useful lumber wrapping apparatus for packaging select pieces of lumber whereby this select lumber may be readily shipped to distant points of use without incurring damage.

There are several types of select lumber such as cedar used for the interior of cedar chests, finishing woods of all types and soft woods whose value would be greatly depreciated if damaged even slightly during shipment to the point of use. Once a piece of select lumber has been scored or otherwise damaged it cannot be sold for use in areas where its imperfections would be readily observed and therefore its value is depreciated considerably. It is therefore the main object of this invention to provide a lumber wrapping apparatus capable of wrapping select pieces of wood in a manner whereby the possibility of the wood becoming damaged during shipment will be greatly reduced.

A further object of this invention, in accordance with the immediately preceding object, is to provide a lumber wrapping apparatus capable of cutting desired lengths of wrapping material from a roll of the latter and wrapping the cut section of wrapping material about a stack of select lumber into a package completely enclosing the stack of lumber and sealing the package so that it will remain intact until it is desired to open the same.

Inasmuch as wrapping material may be most conveniently handled in a rolled state, it is still another object of this invention to provide cutting means on the lumber wrapping apparatus capable of cutting a blank from a roll of wrapping material which may be readily folded into a container enclosing a stack of select lumber.

A still further object, in accordance with the immediately preceding object, is to provide a cutting apparatus which will be capable of cutting sections of scored wrapping material such as single face scored corrugated paper from a roll of the single face corrugated paper and in a manner whereby each of the cut sections of wrapping material will have end flaps formed on the opposite ends thereof that may be readily folded across the ends of a stack of lumber being wrapped.

Another object of this invention is to provide a cutting apparatus including feed means for feeding the wrapping material from the roll to a position whereby the wrapping material may be cut in the desired lengths.

A further object is to provide a cutting apparatus including a cutting member having a substantially planar surface over which wrapping material from the roll may pass and a head movable toward and away from the planar surface and having a face generally paralleling the planar surface constructed of a resilient material and also to provide the planar surface over which the wrapping material is passed with upstanding knife blades engageable by the resilient face of the head whereby the material to be cut may be compressively engaged between the free ends of the knife blades and the resilient face of the head.

A still further object, in accordance with the immediately preceding object, is to provide the planar surface having the knife blades projecting therefrom with resilient elements disposed on opposite sides of each of the knife blades and projecting away from the planar surface a distance greater than that which the knife blades project in order that after the wrapping material has been cut by the knife blade and the head has been moved away from the cutting member the resilient elements will urge the cut sections of wrapping material free of the cutting blades.

Still another object of this invention is to provide the cutting apparatus with discharge means for discharging cut sections of wrapping material to a wrapping point at which the sections of wrapping material may be wrapped about a stack of select lumber.

A further object of this invention in accordance with the immediately preceding objects is to provide control means for the cutting apparatus whereby the feeding, cutting and dispensing operations may be automatically controlled.

Another object of great importance is to provide a wrapping apparatus for receiving cut sections of wrapping material from the cutting apparatus and wrapping the cut section of wrapping material about a stack of lumber placed thereon in an automatic manner and in a manner whereby the wrapping material will be secured about the stack of lumber and form a package of the same.

Another object of this invention, in accordance with the immediately preceding object is to provide a wrapping apparatus which will be capable of dispensing packages of wrapped lumber from the wrapping apparatus as soon as the wrapping of that stack of lumber has been completed in preparation for receiving the next section of wrapping material cut by the cutting apparatus.

A still further object of this invention is to provide a wrapping apparatus which will be capable of being adjusted for wrapping stacks of lumber of various sizes.

Another object of this invention is to provide a wrapping apparatus whose operations may be controlled by a single timer in coordination with a timer operating the cutting apparatus in order that the cutting of sections of wrapping material and the folding of the wrapping material about a stack of select lumber may be accomplished in an orderly, economical and effective manner.

A final object to be specifically enumerated herein is to provide a wrapping apparatus in accordance with the preceding objects which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the lumber wrapping apparatus of the instant invention showing the manner in which the separate cutting and wrapping mechanisms thereof may be aligned in order that select stacks of lumber may be wrapped in a continuous manner;

FIGURE 2 is a top plan view of the lumber wrapping apparatus shown in FIGURE 1;

FIGURE 3 is an end elevational view on somewhat of an enlarged scale and of the lumber wrapping apparatus as seen from the right side of FIGURE 1;

FIGURE 4 is an enlarged longitudinal fragmentary vertical sectional view of the cutting mechanism taken substantially upon a plane passing through the longitudinal center line thereof;

FIGURE 5 is a fragmentary vertical transverse sectional view taken substantially upon the plane indicated by the section line 5—5 of FIGURE 4;

FIGURE 6 is a further enlarged fragmentary longitudinal vertical sectional view of the cutting mechanism showing the manner in which predetermined lengths of wrapping material may be cut from a roll of wrapping material;

FIGURE 7 is a somewhat enlarged fragmentary longitudinal vertical sectional view of the wrapping mechanism of the lumber wrapping apparatus;

FIGURE 8 is a fragmentary enlarged top plan view of the end of the wrapping mechanism remote from the cutting mechanism;

FIGURE 9 is a fragmentary transverse vertical sectional view taken substantially upon the plane indicated by section line 9—9 of FIGURE 8 and showing the manner in which a section of wrapping material may be wrapped about a stack of select lumber positioned on the wrapping apparatus.

FIGURE 10 is a fragmentary transverse vertical sectional view taken substantially upon the plane indicated by the section line 10—10 of FIGURE 8;

FIGURE 11 is a fragmentary longitudinal vertical sectional view taken substantially upon the plane indicated by section line 11—11 of FIGURE 8;

FIGURE 12 is a diagrammatical view of the timer and electrical control circuit of the lumber wrapping apparatus;

FIGURE 13 is a top plan view of a section of wrapping material after it has been cut by the wrapping mechanism; and FIGURE 14 is a perspective view of a stack of lumber wrapped in wrapping material by means of the lumber wrapping apparatus.

Referring now more specifically to the drawings the numeral 10 generally designates a lumber wrapping apparatus of the instant invention which includes a cutting table 12 and a wrapping table 14.

With attention directed more specifically to FIGURES 1 through 6 of the drawings it will be seen that the cutting table 12 includes a pair of front and rear end leg assemblies 16 and 18 respectively. A table top generally referred to by the reference numeral 20 is secured to the upper ends of the leg assemblies 16 and 18 by means of suitable fasteners 22 and a plurality of resilient mounting members 24 are disposed between the table top 20 and the leg assemblies 16 and 18. A hydraulic ram assembly generally designated by the reference numeral 26 including a fluid cylinder 28 is mounted on one side of the table top 20 with the fluid cylinder 28 disposed above the middle of the table top. The fluid cylinder 28 has a piston 31 slidingly disposed therein provided with an externally threaded and outwardly extending piston rod 30 to which a head generally referred to by the reference numeral 32 is secured. The head 32 is secured to the outer end of the piston rod 30 and includes an abutment member 34 constructed of resilient material such as rubber and provided with a substantially planar lower face 36. Upon actuation of the fluid cylinder 28 the head 32 and abutment member 34 are movable toward and away from a cutting member 38 mounted in an opening 40 formed in the table top 20 by means of an adjustable depending support assembly referred to in general by the reference numeral 42 and including an adjustment screw 44 by which the elevation of the cutting member 38 may be adjusted. The cutting member 38 includes a transversely extending and upwardly projecting cutting blade 46 and a plurality of longitudinally extending blades 48 which intersect the transverse blade 46 or spaced longitudinally therealong and extend to opposite sides thereof. A plurality of resilient elements 50 are disposed on opposite sides of each of the blades 46 and 48 and project upwardly from the cutting member 38 a distance slightly greater than the blades 46 and 48.

The fluid cylinder 28 is actuated by an electrically controlled valve 52 which services the inlet line 54 and the exhaust line 56. Upon actuation of the valve 52 in one direction fluid under pressure is admitted into the inlet line 54 and the inlet port 58 in the fluid cylinder 28. After the piston 31 has been urged downwardly by the fluid pressure thereabove to cut a section of wrapping material from the roll of wrapping material generally designated by the reference numeral 60, the valve 52 is again actuated and the inlet line 54 becomes an exhaust line and fluid under pressure is supplied to the fluid cylinder 28 by means of the line 56 and port 61 to urge the piston upwardly to retract the head 32. It is to be noted that abutment member 34 is constructed of a resilient material so that the cutting edges of the blades 46 and 48 may penetrate entirely through the wrapping material without the blades being blunted as is possible when the abutment member is constructed of a rigid material such as metal. Although machines can be built with tolerances such that cutting blades may abut against abutment members constructed of rigid materials without dulling the blade, this requires extremely heavy materials, automatic compensation for expansion of materials due to temperatures changes and constant alignment and adjustment of the cutting blade and the rigid abutment member. The lumber wrapping apparatus has portability as an ancillary object and therefore while constructed rigidly and with sufficient strength to carry out its desired function, the apparatus 10 is not constructed of massive proportions necessary to effect the extremely close tolerances required by cutting edges abutting against rigid abutment members in order that the apparatus 10 may be moved from one location to the other with a minimum of effort.

The table top 20 has an additional pair of openings 64 and 66 formed therein through which peripheral portions of serrated rollers 68 and 70 project. Additionally, a peripheral portion of a tension roller 72 projects into the opening 64. The serrated drive rollers 68 and 70 are each drivingly connected to a motor 74. The drive roller 68 is connected to the motor 74 by means of a transmission 76 and the drive roller 70 is drivingly connected to the roller 68 by means of an endless belt 78 which is entrained over a pulley (not shown) secured to the roller 68 and a pulley 80, see FIGURE 1, secured to the roller 70. Any form of suitable housing 82 may be utilized to enclose the pulleys secured to the rollers 68 and 70 and the endless belt 78. It is to be understood that the tension roller 72 has a resilient outer covering 84 and that it may be drivingly connected to the roller 68 in any convenient manner such as by an endless belt similar to endless belt 78.

A pair of support arms 84 and 86 project forwardly of the table top 20 and are supported at their outer ends by means of a pair of adjustable angle braces 88 and 90. A pair of slides 92 and 94 are carried by the arms 84 and 86 and are slidably mounted thereon. Each of the slides 92 and 94 includes a pair of set screws 96 for engagement with the corresponding arm in order to adjustably position the slides 92 and 94 on the arms 84 and 86. Each of the slides 92 and 94 includes an upwardly projecting flange 98 having an upwardly opening notch 100 formed therein. Opposite ends of a support shaft 102 are seated in the notches 100 and one end of the shaft 102 is provided with a pair of longitudinally spaced collars 104 and 106 which are diametrically enlarged and prevent the shaft 102 from being axially displaced.

The shaft 102 is utilized to rotatably support the roll 60 of single face corrugated wrapping material which may be pre-scored along lines 108, 110, 112 and 114.

The arms 84 and 86 also have a second pair of slides 116 and 118 slidably mounted thereon provided with setscrews 120 for adjustably positioning the slides along the arms 84 and 86. A guide shaft 122 has its opposite ends secured to the slides 116 and 118 and has adjustably positioned thereon by means of setscrews 124 a pair of guide slides 126 and 128 which embrace opposite sides of the roll of corrugated wrapping material as fed from the roll 60 to the drive roller 68.

The cutting table 12 also includes a glue dispensing assembly generally referred to by the reference numeral 130 which includes a glue reservoir 132, an electrically operated valve assembly 134, a supplying line 136 leading from the reservoir 132 to the valve 134 and a dispensing line 138 leading from the valve 134 to the dispensing nozzle 140.

As will hereinafter be more fully set forth, the cutting table 12 is provided with a control means for actuation of the motor 74, ram assembly 26 and glue dispensing assembly 130. The motor 74 is actuated until a given amount of the wrapping material has passed between the drive roller 68 and the tension roller 72 and then its operation is terminated. Then, the fluid cylinder 28 is actuated by means of the valve 52 and the wrapping material is cut by the cutter member 38. However, during operation of the motor 74 the roller 70 is operated and at the same time the glue dispensing assembly is operated to dispense glue from the reservoir 32 out of the nozzle 140 along one side of the section of wrapping material moving past the roller 70.

With attention now directed to FIGURES 1 through 3 and 7 through 11, it will be noted that the wrapping table 14 also includes a pair of support leg assemblies which are generally designated by the reference numerals 150 and 152. The top of the wrapping table 14 comprises a pair of transverse support members 154 and 156 which are secured between the upper ends of the legs of each of the leg assemblies 150 and 152 and a pair of longitudinal members 158 and 160 which are secured between the corresponding legs of the leg assemblies 150 and 152.

A first longitudinally extending support member 162 is fixedly secured between the transverse members 154 and 156 in any convenient manner such as by welding 164. A second longitudinally extending support member 166 has a slide assembly generally referred to by the reference numeral 168, see FIGURES 8 and 9, secured to opposite ends thereof which slide assemblies have horizontal flanges 170 in sliding contacting relation with the upper surfaces 172 of the transverse members 154 and 156. In this manner, the second longitudinally extending support member 166 is secured between the transverse members 54 and 156. Each of the slide assemblies 168 includes a roller guide assembly generally referred to by reference numeral 174 including a plurality of rollers 176 which are in rolling contacting relation with the confronting surfaces of the transverse members 154 and 156 to prevent longitudinal displacement of the longitudinally extending support member 166. Each of the slide assemblies 168 is connected to a crank arm 178 by means of an adjustable tie rod 180 pivotally secured to the crank arm 178 at one end as at 182 and to the roller guide assembly 174 at the other end as at 184. The crank arms 178 are rigidly connected to an operating shaft 186 whose opposite ends are journalled in journals 188 carried by the lower transverse members 190 and 192 secured between the lower ends of the legs of each leg assembly 150 and 152.

A crank arm 194 is secured to the shaft 86 intermediate its opposite ends and the free end of the crank arm 192 is pivotally secured to a nut 194 threadedly engaged with a screw shaft 196 journaled for rotation by means of a journal 198 pivotally secured to the longitudinal member 160 by means of pivot pin 200 which is rotatably mounted by means of a pair of apertured mounting lugs 202, see FIGURE 8. The mounting lugs 202 extend upwardly from the longitudinal member 160 and are fixedly secured thereto. The outer end of the screw shaft 196 has a crank 204 secured thereto in any convenient manner and thus it may be appreciated that by rotation of the crank 204 the distance between the longitudinal support member 166 and the longitudinal support member 162 may be adjusted.

Disposed between the longitudinal support members 162 and 166 is a conveyor assembly generally referred to by the reference numeral 206.

Each of the leg assemblies 150 and 152 includes a pair of longitudinally extending apertured mounting lugs 208 and 210 by which the opposite ends of transverse shaft 212 are rotatably journalled. A pair of rigidly braced and spaced mounting plates 214 and 216 are rotatably journaled on the transverse shaft 212 carried by the rear end of the wrapping table 14 and a pair of similar mounting plates 218 are rotatably journaled on the transverse shaft 212 carried by the forward end of the wrapping table 12. An idle roller 220 is journalled between the forward ends of the mounting plates 218 on the forward end of the wrapping table 12 by means of shaft 222 rotatably journalled therebetween. A pivot shaft 224 is secured between the rear ends of the plates 218 carried by the forward end of the wrapping table 12 and has one end of a longitudinally extending brace member 226 pivotally secured thereto. It will be noted that the brace member 226 is substantially T-shaped in cross-section and that the other end thereof is pivotally secured to a pivot shaft 228 secured between the upper ends of the plates 218 carried by the rear end of the wrapping table 12. A drive roller 230 is rotatably journalled between the rear ends of the plates 218 carried by the rear end of the wrapping table 12 by means of shaft 232 and is drivingly connected to an electric motor 234 supported by a mounting plate 236 secured between the lower ends of the mounting plates 218 by means of a transmission 238 and an endless chain 240.

It will be noted that the pivot shafts 224 and 228 may be elevated relative to the longitudinally extending support members 162 and 166 by rotation of the corresponding mounting plates 218 in a counterclockwise direction about the shaft 212. An endless flexible belt 242 is entrained over the idle and drive rollers 220 and 230 and includes a lower reach 244 passing beneath the upper surface of the wrapping table 12 and an upper reach 246 passing over the T-shaped brace member 226. An extensible fluid motor generally referred to by the reference numeral 250 is pivotally secured to the wrapping table 12 at one end as at 252 and to the mounting plate 236 at the other end as at 254. The fluid motor 250 is operatively connected to fluid lines 256 and 258 for extending and contracting the fluid motor 250. Upon extending of the fluid motor 250, the pairs of mounting plates 218 on opposite ends of the wrapping table 12 will be rotated in a counterclockwise direction and thereby raising the T-shaped longitudinally extending brace member 226 whereupon the upper reach 246 of the endless flexible belt 244 will be raised above the upper surfaces of the elongated longitudinally extending support members 162 and 166. It will be noted that the fluid lines 256 and 258, as will be hereinafter more fully set forth, are connected to suitable valve means actuated upon actuation of the motor 234 whereupon as soon as the motor 234 is actuated the upper reach 246 of the endless flexible member 242 will be raised above the longitudinally extending support members 162 and 166 whereby an object resting upon the support members 162 and 166 will be raised and conveyed by means of the upper reach 246 of the endless flexible member 242 of the conveyor assembly 206.

Carried by the opposite ends of each of the longitudinally extending support members 162 and 166 is an apertured mounting lug 260. A pair of side holding flaps 262 have their inner marginal edge portions pivotally secured to the free ends of corresponding mounting lugs 260 by means of pivot fasteners 264. Each of the side folding flaps 262 is provided with longitudinal bracing members 266 and includes a resilient upper or inner face member 268. Each of the side holding flaps 262 also includes transverse bracing members 270 and the upper or outer ends thereof are pivotally secured to top folding flap assemblies generally referred to by the reference numeral 272 by means of pivot pins 274 along one longitudinal side edge thereof. A pair of electrically operated extensible motors 276 and 278 are pivotally secured at their lower ends as at 280 and 282 respectively. The extensible motor 276 is supported by means of a vertical support member 284 whose lower end is provided with a bifurcated mount 286 between furcations of which the lower end of the extensible motor 276 is pivotally mounted. The extensible motor 276 includes an actuating rod 288 which is pivotally secured to the corresponding side folding flap 262 as at 290. The lower end of the extensible motor 278 is pivotally supported between the furcations of the bifurcated mount 292 supported by means of a brace carried by the longitudinal member 158. The extensible motor 278 includes an actuating rod 296 whose free end is pivotally secured to the corresponding side folding flap 262 as at 298. Accordingly, and from a comparison of FIGURES 3 and 9 it will be noted that upon actuation of the extensible motors 276 and 278 that the side folding flaps 262 may be pivoted from a substantially horizontally disposed position such as that illustrated in FIGURE 3 to an upstanding position such as that illustrated in FIGURE 9.

Each of the side folding flaps 262 includes a brace member 200 which extends outwardly from the corresponding side folding flap 262 and has pivoted to its free end portion 300 by means of a pivot shaft 302, an extensible fluid motor generally referred to by the reference numeral 304. Each of the extensible fluid motors 304 includes an actuating shaft 306 whose free end is pivotally secured to the corresponding top folding flap assembly 272 as at 308. Each of the top folding flap assemblies 272 includes an angle member 310 suitably apertured at longitudinally spaced points therealong such as at 312 and provided with sleeve members 314 registerable with the apertures 312. Each of the sleeve members 314 is provided with a threaded bore 316 communicating with the interior thereof and in which a thumb setscrew 318 is threadedly engaged. Each of the top folding flap assemblies 272 includes an adjustable outer end member 320 which is supported by means of a plurality of extension rods 322 received within the apertures 312 in the corresponding sleeves 314 and secured in adjusted positions therein by means of the thumb setscrews 318. In this manner, the outer end members 320 may be adjusted relative to the portions of the top folding flap assembly 72 pivotally secured to the side folding flaps 262 as desired.

With attention now directed more specifically to FIGURE 10 of the drawings it will be noted that one of the outer end members 320 includes an electrical heating element 324 which may be utilized to supply the desired amount of heat to the corresponding outer end member for a purpose to be hereinafter more fully set forth.

Each of the top folding flap assemblies 272 includes a pair of resilient pads 326 and 328 similar to the resilient face members 268 carried by the side folding flaps 262.

With attention now directed more specifically to FIGURES 8 and 11 of the drawings it will be noted that each end of the wrapping table 14 includes a pair of mounting plates 330 and 332. A pair of side folding flaps 334 and 336 are pivotally secured to the corresponding mounting plates 332 and 330 respectively by means of pivot pins 338 and 340 for movement about upstanding axes. Each of the side folding flaps 334 and 336 includes a crank arm 342 which is operatively connected to an electric solenoid 344 by means of a pin and slot connection 346. Upon actuation of the solenoids 344 the crank arms 342 will be swung about the axis of rotation of the corresponding pivot shaft 338 whereupon the associated side folding flap may be pivoted between the longitudinally extending position illustrated in FIGURE 8 to a position extending transversely of the wrapping table 14. Each of the mounting plates 232 also includes a solenoid 348 operatively connected to a crank arm 350 carried by a bottom folding flap 352 pivotally mounted by means of pivot shaft 354. The solenoid 348 is connected to the crank arm 350 by means of a pin and slot connection 354 whereby upon actuation of the solenoid 348 the bottom folding flap 352 may be pivoted from between the substantially horizontally disposed position illustrated in FIGURE 11 to an upstanding position extending upwardly and across the folding table 14.

In addition to the bottom folding flap 352 which comprises one tail-off flap assembly, the folding table 14 includes a second tail-off flap assembly generally referred to by the reference numeral 356. The tail-off flap assembly 356 includes an upright standard 358 carried by each of the mounting plates 332 by which a glue dispensing roller 360 is swingably mounted for movement through an arc. The glue dispensing roller 360 is journalled for rotation about an horizontal axis extending transversely of the free end of an arm 362, see FIGURE 3 whose other end is pivotally secured to the standard 358 by means of pivot shaft or pin 364. The arm 362 is extensible and is provided with a compression spring 366 for urging the arm 362 to its extended position. Secured to the inner end of the arm 362 and journaled by means of pivot pin 364 is a crank arm 368. The crank arm 368 is operatively connected to a solenoid 370 by means of a pin and slot connection 372 and thus it may be apparent that upon actuation of the solenoid 370 the glue dispensing roller 360 will be swung in a counterclockwise direction as viewed in FIGURE 11 until the arm 362 is in a substantially horizontally disposed position.

The glue dispensing roller 360 is supplied with glue by means of delivery line 374 which may be operatively connected to the glue reservoir 132 on the cutting table 12.

With attention again directed to FIGURE 3 of the drawings it will be noted that a pair of compression springs 376 and 378 are disposed between the mounting plates 214 and 216 and the confronting surfaces of the mounting lug 210 and the mounting lug 380 which is also suitably apertured and rotatably journals the shaft 212. The mounting lug 380 is carried by the corresponding slide assembly 168 and it may therefore be appreciated that upon adjustment of the longitudinal support member 166 away from the longitudinal support member 162 by manipulation of the crank 204 that the tension on the compression spring 378 will be reduced whereupon the tension of the compression spring 376 will slide the mounting plates 214 and 216 and the other component parts of the conveyor assembly 206 to the right as viewed in FIGURE 3, which will automatically center the conveyor assembly 206 between the longitudinal support members 162 and 166.

It is to be noted that while the specific structural features of only the rear end of the wrapping table have been specifically set forth herein with regard to the mounting of the conveyor assembly 206, the side folding flaps and tail-off flap assemblies, the forward end of the folding table 14 is constructed in substantially the same manner. Accordingly, it is believed unnecessary to more specifically set forth the construction of the forward end of the folding table.

With reference now to FIGURES 7 and 9 of the drawings it will be noted that a support standard 382 may be adjustably positioned along the longitudinal member 160 by means of a clamp assembly 384 carried by the lower end thereof which embraces the longitudinal member 160. The support standard 382 includes a pair of horizontal arm members 386 which project inwardly and have secured to their inner ends an electric eye element 388.

The electric eye elements 388 are aligned with each other and detect the passage of a cut section of wrapping material passing therebetween.

With reference now in particular to FIGURE 13 of the drawings there will be seen a typical section of wrapping material generally designated by the reference numeral 390. As previously set forth, the wrapping material is scored along lines 108, 110, 112 and 114. Additionally, as previously set forth, the cutting member 38 includes knives 46 and 48 which extend transversely and longitudinally of the cutting table 12 respectively. The transversely extending knife blade 46 forms a transverse cut in the wrapping material to cut the section 390 therefrom along line 392 and the longitudinally extending knives 48 form the blind transversely spaced and longitudinally extending cuts 394 to form the side flaps 396, the bottom flap 398 and the top flaps 400 and 402 on each end of the section 390.

After the section 392 has been placed on the folding table 14, the stack of lumber 404 is placed upon the section 390 and the side folding flaps 362 may then be utilized to fold up the sides 406 of the section 390 over the sides of the stack of lumber 404. Then, the top folding flap assemblies 272 may be utilized to fold the top flaps 408 over the top of the stack 404. It is to be noted that a layer of glue 410 is applied along one longitudinal edge of the panel section 390 by means of the glue being dispensed from the nozzle 140 during movement of the section 390 past the nozzle 140 and that the outer end member 320 provided with the heating element 324 will heat this marginal edge portion of the section 390 to hasten the curing of the layer of glue 410 and the sealing of the top flaps 408 together. While the top flaps 408 are being glued together, the side folding flaps 336 may be actuated by means of the solenoids 344 to fold inwardly the side flaps 396. Then, the glue applying roller 360 is swung counterclockwise as viewed in FIGURE 11 to apply glue to the upper surface of the top flaps 400 and 402 after which the bottom folding flap or lower tail-off flap 352 is actuated by means of the solenoid 348 to fold the lower or bottom end flaps 398 upwardly and over the free ends of the top or upper end flaps 400 and 402 to form the package of stacked lumber generally designated by the reference numeral 412, see FIGURE 14.

With attention now directed more specifically to FIGURE 12 of the drawings it will be noted that the control means for the cutting table 12 is generally designated by the reference numeral 414 and that the control means for the folding table 14 is generally designated by the reference 416.

The control means 414 includes a timing or timer assembly generally referred to by the reference numeral 418 and the feed motor 74 is operatively connected to the timer 418 by means of electrical conductors 419 and 420. The fluid cylinder 128 is actuated by the valve 52 which has a fluid pressure supply line 422 leading to a suitable source of fluid pressure. The valve 52 is electrically connected to the timer 418 by means of electrical conductors 424 and 426.

It is to be noted that the glue reservoir 132 is pressurized and that the valve 134 is operatively connected to the timer 418 by means of electrical conductors 428 and 430. Additionally, it will be noted that the electric eye elements 388 are operatively connected to the timer for 418 by means of electrical conductors 432 and 434.

The control means 416 also includes a timer which is generally referred to by the reference numeral 436. The solenoids 370 are each electrically connected to the timer 436 by means of electrical conductors 438 and 440. The solenoids 344 are each connected to the timer 436 by means of electrical conductors 442 and 444 while the each solenoid 348 is connected to the timer 436 by means of electrical conductors 446 and 448. Additionally, each of the electrically operated extensible motors 276 and 278 is operatively connected to the timer 346 by means of a pair of electrical conductors 450 and 452 connected to transformers 454 disposed in the circuit defined by the electrical conductors 456 and 458. The extensible fluid motors 304 are each operatively connected to the timer 436 by means of electrical conductors 460 and 462 which operate the air valve 464 controlling the air applied to and exhausted from opposite sides of the pistons of the extensible fluid motors 304.

The extensible fluid motor 250 is connected to an air valve 466 by means of conduits 468 and 470 and the air valve 466 is operatively connected to the timer 436 by means of electrical conductors 472 and 474.

It is to be noted that the timers 418 and 436 may be conventional timers such as those motor-driven cam operated timers manufactured by Industrial Timer Corporation (Serial RC or MC). Additionally, many other component parts of the lumber wrapping apparatus 10 may be of conventional design and commercially available such as the numerous extensible motors, solenoids, electric eye elements and electric motors. Further, the numerous extensible motors may be actuated either by compressed air as previously set forth or by hydraulic fluid.

In operation, a length of wrapping material is unreeled from the roll 60 upon actuation of the drive roller 68 and is positioned beneath the head 32. After the desired length of wrapping material has been passed beneath the head 32 the beam cast by one of the electric eye elements 388 is broken and the motor 74 is stopped. Then, the head 32 is lowered upon actuation of the fluid cylinder 28 whereupon a section such as section 390 is cut from the roll of wrapping material. The drive rollers 68 and 70 are again actuated and the drive roller 70 may be driven at a higher speed than the drive roller 68 in order to move the section 390 from under the head 32 faster than a new length of wrapping material may be positioned thereunder. When the new length of wrapping material again breaks the beam cast by one of the electric eye elements 388, the drive rollers 68 and 70 are then again stopped. Upon movement of each section 390 past the nozzle 140 the glue dispensing assembly 130 applies a layer 410 of glue to one marginal edge portion thereof. Then, while the next section 390 is being cut from the roll of wrapping material the section 390 positioned on the wrapping table 14 may be folded about the stack of lumber 404 positioned thereon. The timer 436 controls the various steps of wrapping the stack of lumber 404 and as soon as the conveyor motor 348 is actuated and the conveyor is raised to move the package 412 from the wrapping table 14, the fluid cylinder 28 is then again actuated to lower the head 32 in order to cut the next section of wrapping material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lumber wrapping apparatus for packaging select pieces of lumber comprising a dispensing section for cutting and dispensing sections of wrapping material including a cutting table having means adapted to rotatably mount a roll of wrapping material, feed means adapted to engage and feed wrapping material from said mounting means and cutting means adapted to cut a section from the wrapping material fed from said roll and a wrapping section including a wrapping table for receiving sections of wrapping material from said support table having means adapted to support a section of wrapping material in a substantially horizontally disposed position and means for folding said section of wrapping material about a stack of lumber placed on said section, said cutting means including means adapted to form a transverse cut through said wrapping material being dispensed from said roll and a series of blind transversely spaced and longitudinally extending cuts through said wrapping material on opposite sides of and communicating with said transverse cut in order to form a pair of top end flaps and opposite side flaps as well as a single bottom end flap on both ends of sections of wrapping material being dispensed from said roll, said cutting means comprising a cutting member having a substantially planar surface over which wrapping material from said roll is adapted to pass, a head movable toward and away from said planar surface and having a face generally paralleling said surface, a plurality of cutting blades projecting from said surface and toward said face and including a single blade and short laterally spaced blades extending at right angles to and from opposite sides of said single blade, said head being movable to a position with the outer edges of said blades contacting said surface whereby to cut wrapping material positioned between said head and backing member.

2. The combination of claim 1 wherein said cutting table includes means adapted to discharge cut sections of wrapping material from said support table to said cutting table, means adapted to apply glue along one longitudinal side edge of a section of wrapping material being discharged longitudinally from said cutting table, said folding means including a movably mounted sealing flap adapted to engage the marginal portion of said section including said one longitudinal edge and firmly press said one edge into surface to surface contacting relation with the opposite longitudinal marginal portion, said flap including heating means for heating said one longitudinal edge to hasten the curing of said glue.

3. The combination of claim 1 wherein said face is constructed of a resilient material and said cutting member includes a plurality of resilient elements disposed on opposite sides of each of said blades and projecting slightly beyond the free ends of said blades whereby upon movement of said head away from said cutting member said resilient elements will urge the cut wrapping material outwardly of said blades and out of engagement therewith.

4. A lumber wrapping apparatus for packaging select pieces of lumber comprising a dispensing section for cutting and dispensing sections of wrapping material including a cutting table having means adapted to rotatably mount a roll of wrapping material, feed means adapted to engage and feed wrapping material from said mounting means and cutting means adapted to cut a section from the wrapping material fed from said roll and a wrapping section including a wrapping table for receiving sections of wrapping material from said support table having means adapted to support a section of wrapping material in a substantially horizontally disposed position and means for folding said section of wrapping material about a stack of lumber placed on said section, means adapted to discharge cut sections of wrapping material from said cutting table to said wrapping table, control means operatively connected to said feed means, cutting means, and discharge means for controlling the duration of operation of each and operating each in timed sequence relative to the others, said control means including electric eye means for controlling the operation of said discharge means.

5. The combination of claim 4 wherein said control means includes means for operating said feed means and cutting means in sequence and in response to operation of said discharge means.

6. A wrapping apparatus for wrapping cut sections of wrapping material about a stack of lumber, said wrapping apparatus comprising a wrapping table, including two transversely spaced and longitudinally extending support members carried by the upper portion of said table, a pair of side folding flaps pivotally secured to said support members for movement about longitudinally extending axes and adapted to fold the opposite side marginal portions of a section of wrapping material disposed on said support members and projecting beyond the sides of a stack of lumber positioned on said section upwardly over the sides of said stack, actuating means secured between said table and side folding flaps for effecting movement of the latter and a pair of top folding flaps pivotally secured to the outer portions of said side flaps for movement about longitudinally extending axes and adapted to fold the marginal portions of said section projecting above said stack over the top of the latter, actuating means secured between corresponding side and top flaps for effecting pivotal movement of the top flaps relative to said side flaps.

7. The combination of claim 6 wherein said top flaps each includes means for adjusting their effective width.

8. A wrapping apparatus for wrapping cut sections of wrapping material about a stack of lumber, said wrapping apparatus comprising a wrapping table including two transversely spaced and longitudinally extending support members carried by the upper portion of said table, a pair of side folding flaps pivotally secured to said support members for movement about longitudinally extending axes and adapted to fold the opposite side marginal portions of a section of wrapping material disposed on said support members and projecting beyond the sides of a stack of lumber positioned on said section upwardly over the sides of said stack, actuating means secured between said table and side folding flaps for effecting movement of the latter and a pair of top folding flaps pivotally secured to the outer portions of said side flaps for movement about longitudinally extending axes and adapted to fold the marginal portions of said section projecting above said stack over the top of the latter actuating means secured between corresponding side and top flaps for effecting pivotal movement of the top flaps relative to said side flaps, means movably mounting one of said support members on said table for movement toward and away from the other of said support members.

9. The combination of claim 8 including a conveyor assembly, means mounting said conveyor assembly on said table between said support members, said mounting means including means for moving said conveyor assembly toward and away from said other support member in proportion to movement of said one support member toward and away from said other support member.

10. The combination of claim 9 wherein said mounting means includes means for centering said conveyor assembly between said support members.

11. The combination of claim 10 wherein said conveyor assembly comprises an endless member including upper and lower reaches extending longitudinally of said wrapping table and includes means for raising and lowering said upper reach above and below the upper surfaces of said support members.

12. The combination of claim 11 wherein said conveyor assembly includes motor means for actuation of said conveyor assembly, said raising and lowering means including means for actuation thereof in response to operation of said conveyor assembly motor means.

13. The combination of claim 6 including a pair of end side tab folding flaps at each end of said table mounted for pivotal movement about upstanding axes, motor means secured between said table and end side flaps for pivoting the latter across the opposite ends of said stack and adapted to fold the sides of said section projecting beyond the ends of said lumber stack inwardly across the opposite ends of said stack, and upper and lower tail-off flap assemblies including motor means therefor at each end of said table mounted for and adapted to fold the top and bottom portions of said section projecting beyond the ends of said lumber stack across the opposite ends of said stack.

14. The combination of claim 13 including control means for actuating the motor means of said end side flaps, one of said tail-off flap assemblies and then the other tail-off flap assemblies in timed sequence.

15. The combination of claim 14 wherein the first actuated tail-off flap assembly includes means adapted to apply glue to the outer surface of the corresponding portion of said section prior to the folding of the other portion of said section thereover.

16. A lumber wrapping apparatus for packaging select pieces of lumber comprising a dispensing section for cutting and dispensing sections of wrapping material including a cutting table having means adapted to rotatably mount a roll of wrapping material, feed means adapted to engage and feed wrapping material from said mounting means and cutting means adapted to cut a section from the wrapping material fed from said roll and a wrapping section including a wrapping table for receiving sections of wrapping material from said support table having means adapted to support a section of wrapping material in a substantially horizontally disposed position and means for holding said section of wrapping material about a stack of lumber placed on said section, means adapted to discharge cut sections of wrapping material from said cutting table to said wrapping table, control means operatively connected to said feed means, cutting means, and discharge means for controlling the duration of operation of each and operating each in timed sequence relative to the others, said control means including electric eye means for controlling the operation of said discharge means, a portion of said support means including a conveyor assembly adapted to discharge wrapped stacks of lumber from said wrapping table in preparation for receiving a fresh section of wrapping material.

17. A wrapping apparatus for wrapping cut sections of wrapping material about a stack of lumber, said wrapping apparatus comprising a wrapping table, including two transversely spaced and longitudinally extending support members carried by the upper portion of said table, a pair of side folding flaps pivotally secured to said support members for movement about longitudinally extending axes and adapted to fold the opposite side marginal portions of a section of wrapping material disposed on said support members and projecting beyond the sides of a stack of lumber positioned on said section upwardly over the sides of said stack, actuating means secured between said table and side folding flaps for effecting movement of the latter and a pair of top folding flaps pivotally secured to the outer portions of said side flaps for movement about longitudinally extending axes and adapted to fold the marginal portions of said section projecting above said stack over the top of the latter, actuating means secured between corresponding side and top flaps for effecting pivotal movement of the top flaps relative to said side flaps, a pair of end side tab folding flaps at each end of said table mounted for pivotal movement about upstanding axes, motor means secured between said table and end side flaps for pivoting the latter across the opposite ends of said stack and adapted to fold the sides of said section projecting beyond the ends of said lumber stack inwardly across the opposite ends of said stack, and upper and lower tail-off flap assemblies including motor means therefor at each end of said table mounted for and adapted to fold the top and bottom portions of said section projecting beyond the ends of said lumber stack across the opposite ends of said stack, control means for actuating the motor means of said end side flaps, one of said tail-off flap assemblies and then the other tail-off flap assemblies in timed sequence, the first actuated tail-off flap assembly including means adapted to condition the outer surface of the corresponding portion of said section for adherence to and prior to the folding of the other portion of said section thereover.

18. The combination of claim 6 including a pair of end side tab folding flaps on at least one end of said table mounted for pivotal movement about upstanding axes, motor means secured between said table and end side flaps for pivoting the latter across the opposite ends of said stack and adapted to fold the sides of said section projecting beyond the corresponding end of said lumber stack inwardly across the corresponding end of said stack, and upper and lower tail-off flap assemblies including motor means therefor on at least said one end of said table mounted for and adapted to fold the top and bottom portions of said section projecting beyond said corresponding end of said lumber stack across that end of said lumber stack across that end of said stack.

19. A wrapping apparatus for wrapping cut sections of wrapping material about a stack of lumber, said wrapping apparatus comprising an elongated wrapping table, a pair of side folding flaps pivotally secured to opposite sides of said support table for movement about longitudinally extending axes and adapted to fold the opposite side marginal portions of the section of wrapping material disposed on said table and projecting beyond the sides of a stack of lumber positioned on said section upwardly over the sides of said stack, actuating means secured between said table and said side folding flaps for effecting movement of the latter and a pair of top folding flaps pivotally secured to the outer portions of said side flaps for movement about longitudinally extending axes and adapted to fold the marginal portions of said section projecting above said stack over the top of the latter, actuating means secured between corresponding side and top flaps for effecting pivotal movement of the top flaps relative to said side flaps.

20. The combination of claim 6 including a conveyor assembly, means mounting said conveyor assembly on said table between said support members with portions of said conveyor positioned for engagement with material supported on said support members.

21. The combination of claim 20 wherein said conveyor assembly comprises an endless member including upper and lower regions extending longitudinally of said wrapping table and includes means for raising and lowering said upper region above and below the upper surfaces of said support members.

22. In combination with a support table adapted to comprise a wrapping station for intermittently wrapping articles disposed thereon, said support table including a pair of transversely spaced and longitudinally extending support members carried by an upper portion thereof and adapted to support articles to be wrapped, means movably mounting one of said support members on said table for movement toward and away from the other of said support members, a conveyor assembly, means mounting said conveyor assembly on said table between said support members with portions of said conveyor positioned for engagement with material supported on said support members, said mounting means including means for moving said conveyor assembly toward and away from other support member in proportion to movement of said one support member toward and away from said other support member.

23. In combination with a support table adapted to comprise a wrapping station for intermittently wrapping articles disposed thereon, said support table including a pair of transversely spaced and longitudinally extending support members carried by an upper portion thereof and adapted to support an article, means movably mounting one of said support members on said table for movement toward and away from the other of said support members, a conveyor assembly, means mounting said conveyor assembly on said table between said support members with portions of said conveyor positioned for engagement with material supported on said support members.

24. The combination of claim 22 wherein said mounting means includes means for centering said conveyor assembly between said support members.

25. The combination of claim 24 wherein said conveyor assembly comprises an endless member including upper and lower regions extending longitudinally of said table and includes means for raising and lowering said upper reach above and below the upper surfaces of said support members.

26. The combination of claim 25 wherein said conveyor assembly includes motor means for actuation of said conveyor assembly, said raising and lowering means including means for actuation thereof in response to operation of said conveyor assembly motor means.

27. In a support table for receiving wrapping material from a roll of material, cutting means for cutting gener-